United States Patent [19]

Saito

[11] Patent Number: 5,598,518

[45] Date of Patent: Jan. 28, 1997

[54] TEXT EDITING APPARATUS FOR REARRANGING SENTENCES

[75] Inventor: Kazuo Saito, Yokohama, Japan

[73] Assignee: Fuji Xerox Co., Ltd., Tokyo, Japan

[21] Appl. No.: 208,261

[22] Filed: Mar. 9, 1994

[30] Foreign Application Priority Data

Mar. 10, 1993 [JP] Japan .................................. 5-075024

[51] Int. Cl.$^6$ .................................................. G06F 17/21
[52] U.S. Cl. ............................................................ 395/793
[58] Field of Search .................................... 395/145, 146,
395/147, 12; 364/419.01–419.19

[56] References Cited

U.S. PATENT DOCUMENTS

| 4,942,526 | 7/1990 | Okajima et al. .......................... 364/419 |
| 5,200,893 | 4/1993 | Ozawa et al. ............................ 364/419 |

FOREIGN PATENT DOCUMENTS

| 62-284459 | 12/1987 | Japan . |
| 62-284457 | 12/1987 | Japan . |
| 63-66665 | 3/1988 | Japan . |
| 63-82541 | 4/1988 | Japan . |
| 63-103373 | 5/1988 | Japan . |
| 2-27473 | 1/1990 | Japan . |
| 2-62656 | 3/1990 | Japan . |
| 2-288962 | 11/1990 | Japan . |
| 2-297150 | 12/1990 | Japan . |
| 3-22083 | 1/1991 | Japan . |
| 3-15972 | 1/1991 | Japan . |
| 3-160561 | 7/1991 | Japan . |
| 4-17059 | 1/1992 | Japan . |
| 4-55975 | 2/1992 | Japan . |

OTHER PUBLICATIONS

"Fuji Xerox—8080/8083—J Star II", Operating Manual for VP View Cords 2.6f(VP2.0), (Fuji Xerox Co., Ltd., Jun. 1988).

Hovy et al, "*Focusing Your RST: A Step Toward Generating Coherent Multisentential Text*", Proceedings of the 11th Annual Conference of the Cognitive Science Society, Aug. 1989.

"MORE II—Planning, Writing, and Desktop Presentations", Operating Manual for MORE II, (Symantec Corporation, Jul. 1989).

*Primary Examiner*—Mark K. Zimmerman
*Assistant Examiner*—Joseph R. Burwell
*Attorney, Agent, or Firm*—Finnegan, Henderson, Farabow, Garrett & Dunner, L.L.P.

[57] ABSTRACT

The present invention provides a text editing support apparatus in which constituents of text and connective relationships among the constituents are received as inputs. The constituents and the connective relationships among the constituents are held within the apparatus, along with rules on the connective relationships among the constituents. The connection rules are applied to the held constituents to form text. The result of text formation obtained by applying the connection rules is displayed.

24 Claims, 10 Drawing Sheets

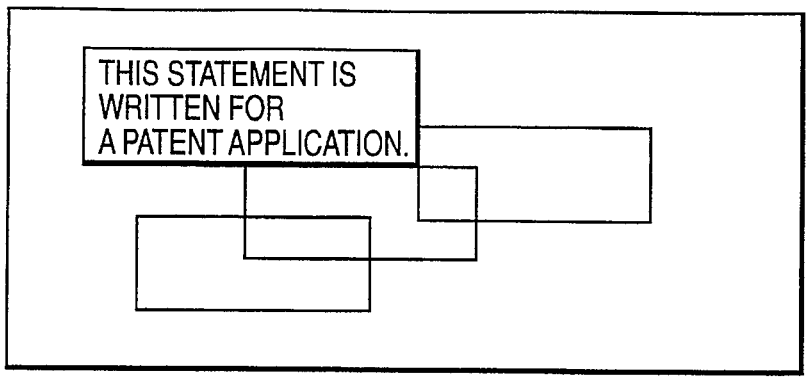
FIG. 2
| CONSTITUENT IDENTIFIER | TYPE OF CONSTITUENT | CONTENT OF CONSTITUENT |
|---|---|---|
| E1 | BASIC | THIS STATEMENT IS WRITTEN FOR..... |
| E2 | BASIC | HOWEVER, IT IS NOT DIRECTLY..... |
| E3 | COMPLEX | R1 |
| ⋮ | ⋮ | ⋮ |
FIG. 3
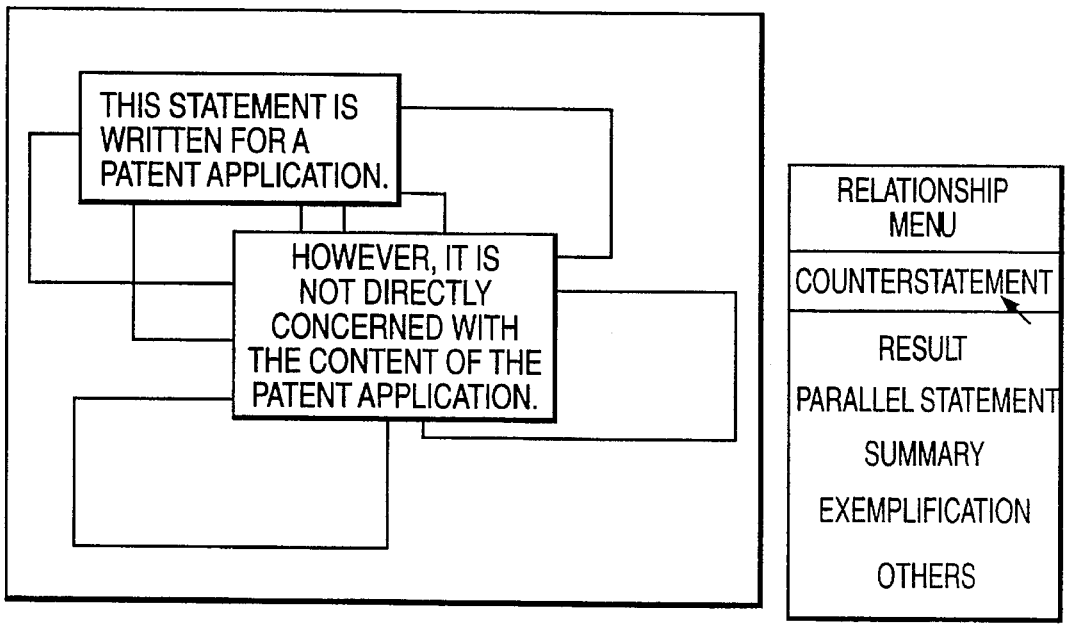
FIG. 4

| CONNECTION RELATIONSHIP IDENTIFIER | TYPE OF CONNECTION RELATIONSHIP | CONSTITUENT LIST |
|---|---|---|
| R1 | COUNTERSTATEMENT | E1, E2 |
| R2 | REASON | E3, E4 |
| R3 |  | E5, E6, E7 |
| ⋮ | ⋮ | ⋮ |

RULE 1: IF THE USER SPECIFIES A CONSTITUENT A AS THE TOPIC, IT SHOULD BE WRITTEN FIRST.

RULE 1': IF THE USER SPECIFIES A CONSTITUENT A AS THE TOPIC, IT SHOULD BE WRITTEN LAST

RULE 2: A CONNECTIVE RELATIONSHIP MAY NOT INTERSECT ANOTHER CONNECTIVE RELATIONSHIP.

RULE 3: IF A CONSTITUENT A HAS PLURAL CONNECTIVE RELATIONSHIPS, PRIORITY SHOULD BE GIVEN TO THE CONNECTIVE RELATIONSHIP HAVING THE FEWEST DEPENDENT CONSTITUENTS.

RULE 4: IF A CONSTITUENT HAS THREE OR MORE CONNECTIVE RELATIONSHIPS WHICH ARE THE SAME, THEY SHOULD BE OUTPUT IN AN ITEMIZED FORM.

RULE 5: IF A CONSTITUENT A HAS A PLURALITY OF CONNECTIVE RELATIONSHIPS AND THEY ARE "REASON" AND "COUNTERSTATEMENT", A CONSTITUENT TO WHICH THE CONNECTIVE RELATIONSHIP OF "REASON" IS DIRECTED IS POSITIONED CLOSER TO THE CONSTITUENT A THAN A CONSTITUENT TO WHICH THE CONNECTIVE RELATIONSHIP OF "COUNTERSTATEMENT" IS DIRECTED.

RULE 6: IF A CONSTITUENT A IS THE "REASON" FOR THE CONSTITUENT B, A SHOULD BE WRITTEN BEFORE B.

RULE 6': IF A CONSTITUENT A IS THE "REASON" FOR THE CONSTITUENT B, A SHOULD BE WRITTEN AFTER B.

*FIG. 8*

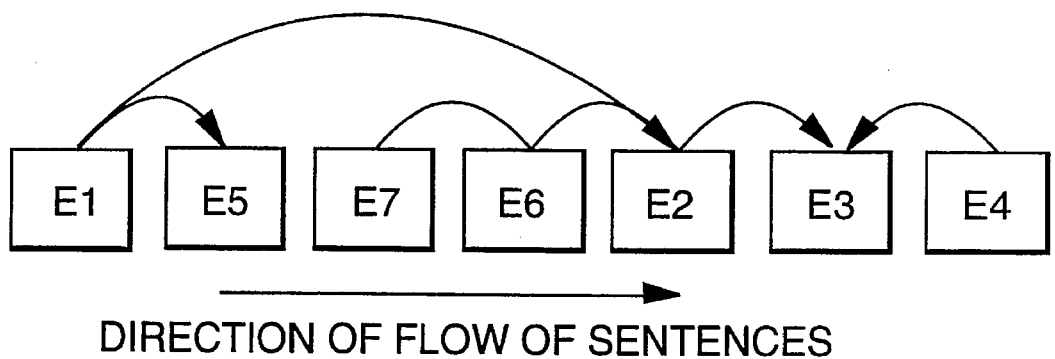
DIRECTION OF FLOW OF SENTENCES
FIG. 9
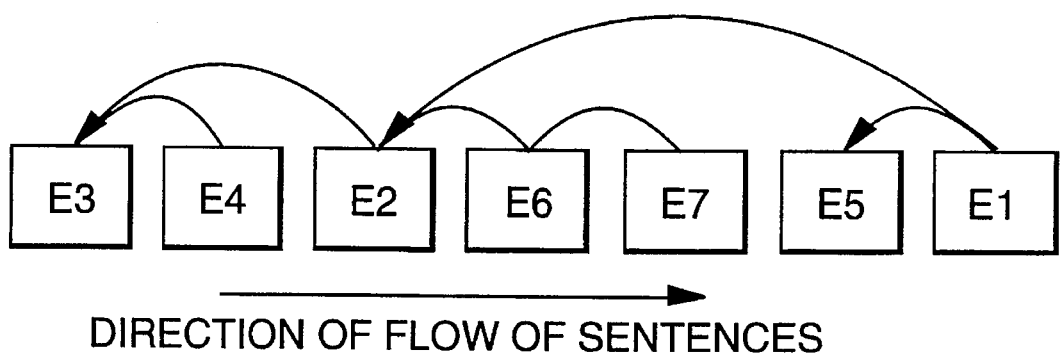
DIRECTION OF FLOW OF SENTENCES
FIG. 10
| CONNECTIVE RELATIONSHIP IDENTIFIER | TYPE OF CONNECTIVE RELATIONSHIP | REPRESENTATIVE CONSTITUENT | CONSTITUENT LIST |
|---|---|---|---|
| R1 | COUNTERSTATEMENT | E1 | E1, E2 |
| R2 | REASON | E4 | E3, E4 |
| R3 |  | E5 | E5, E6, E7 |
| ⋮ | ⋮ | ⋮ | ⋮ |
FIG. 12

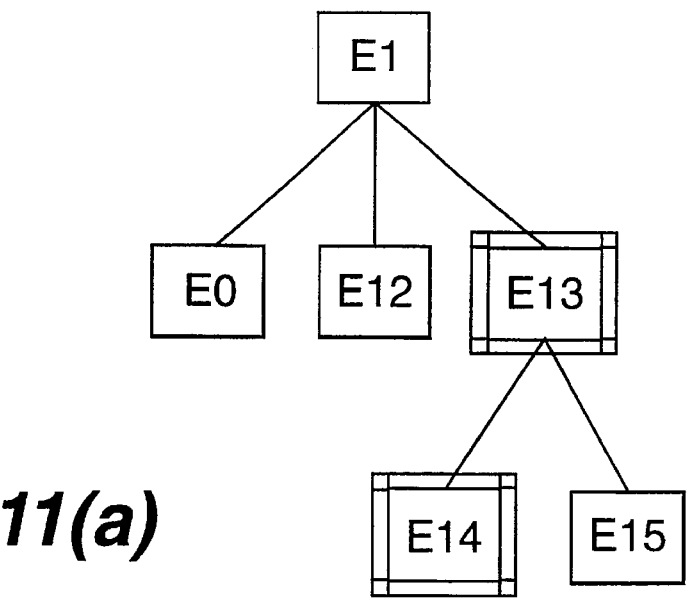
FIG. 11(a)
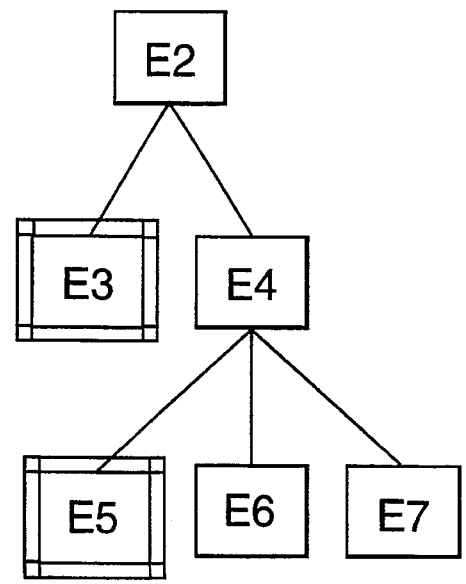
FIG. 11(b)
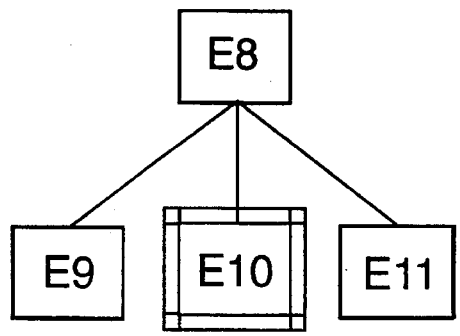
FIG. 11(c)
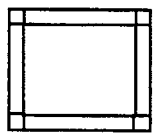 REPRESENTATIVE CONSTITUENT

DESCRIPTION OF THE EMBODIMENT

AS COMPARED WITH CONVENTIONAL WORD PROCESSORS,...THIS STATEMENT IS WRITTEN FOR A PATENT APPLICATION. <u>HOWEVER, IT IS NOT DIRECTLY CONCERNED WITH THE CONTENT OF THE PATENT APPLICATION</u>. BUT...

FIG. 13

THIS STATEMENT IS WRITTEN FOR A PATENT APPLICATION. HOWEVER, IT IS NOT DIRECTLY CONCERNED WITH THE CONTENT OF THE PATENT APPLICATION. BUT...

FIG. 14(a)

HOWEVER, IT IS NOT DIRECTLY CONCERNED WITH THE CONTENT OF THE PATENT APPLICATION.

FIG. 14(b)

TEXT EDITING APPARATUS FOR REARRANGING SENTENCES

BACKGROUND OF THE INVENTION

1. Field of the Invention

The present invention relates to a text editing support apparatus which supports editing of text and is applied to a word processor or the like which composes sentences using a computer or the like.

2. Discussion of the Related Art

Today devices for sentence formation, typically word processors, are in wide use for composing sentences. Initially, the word processor functioned merely to input sentences and provide a relatively simple text layout, but, recently, systems providing support for composing sentences have been proposed.

Japanese Patent Application Unexamined Publications Nos. Sho. 63-103373 (1988) and Hei. 4-17059 (1992) disclose apparatuses supporting syntactic aspects of composition.

The document formation apparatus disclosed by Japanese Patent Application Unexamined Publication No. Sho. 63-103373 (1988) comprises a check order means for issuing an order to check the length of sentences; a calculation means for inspecting a prepared document and calculating the sentence length of sentences in the document; a decision means for deciding whether any of the sentence lengths calculated by the calculation means is more than a predetermined length; and an indication means for indicating the decision results thereby making it possible to inform the user of the presence of excessively lengthy sentences, i.e., sentences which exceed the predetermined length for the prepared document, and helps the user to make the shorter sentences in rewriting this document.

The document formation apparatus disclosed by the Japanese Patent Application Unexamined Publication No. Hei. 4-17059 (1992) comprises a counting means for counting the number of input characters; a means for deciding whether an input character is a punctuation mark; and a character count setting means for setting a maximum number of characters permitted between any two punctuation marks. This apparatus gives an alarm when a punctuation mark is not input within the predetermined number of characters, whereby the user may review the input sentence and insert punctuation marks where they are required.

Japanese Patent Application Unexamined Publication No. Hei. 2-288962 (1990) discloses a document preparation support apparatus which warns the user of missing punctuation marks. The apparatus comprises a morphological element analysis means which, in a language with no overt marking of word breaks makes a word list by analyzing sentences into word units; a sentence structure analysis means which makes a clause list by analyzing the sentences into clause units in accordance with the word list; and a missing punctuation indication means for assessing the clause list for clauses containing breaks and pointing out the breaks as positions where punctuation is missing. That is, the document preparation support apparatus points out positions where punctuation is missing in a document in which the punctuation marks are not inserted properly.

Apparatuses disclosed by Japanese Patent Application Unexamined Publications Nos. Hei. 2-62656 (1990) and Hei. 3-160561 (1991) are proposed to support an expression within a sentence in text.

Japanese Patent Application Unexamined Publication No. Hei. 2-62656 (1990) discloses a Japanese document elaboration support apparatus which comprises an ill-formed expression detecting means for detecting a portion containing an ill-formed expression which requires to be elaborated and for determining the type of the ill-formed expression; an ill-formed expression rule dictionary for storing rules for detecting ill-formed expressions; and a means generating a warning message corresponding to the detected ill-formed expression and the type thereof. The Japanese document elaboration support apparatus enables the user to be informed of the presence of the ill-formed expression and to correct the ill-formed expression, thus maintaining quality for the document.

Another Japanese document elaboration support apparatus disclosed by the Japanese Patent Application Unexamined Publication No. Hei. 3-160561 (1991) comprises a dependent relationship construction means which constructs a data expression showing the dependent relationship between the probability of an ill-formed expression and a result of analysis of modification; a control means which resolves ambiguities in the analysis of the modification concerning the properness of the ill-formed expression with reference to the dependent relationship data and which removes improbable cases from the data of the probability of ill-formed expressions; and a modification determination means which determines whether a specific modification relationship is probable based either on rules of modification determination which are stored in a dictionary, or on a responce to an inquiry to the user. The Japanese document elaboration support apparatus can suggest rewritten examples for the ill-formed expression on a sentence level, which makes it possible to elaborate the input sentences efficiently.

Japanese Patent Application Unexamined Publication Nos. Hei. 2-297150 (1990) and Hei. 3-15972 (1991) disclose apparatuses which support modification of sentences displaying the relationship of sentence modification to a sentence.

A document processing apparatus disclosed by the Japanese Patent Application Unexamined Publication No. Hei. 2-297150 (1990) comprises a sentence analysis means; a sentence generation means; a structure generation means for generating information showing structures of sentences, a display means for displaying the information showing the structures of the sentences; and an input means for inputting editorial information for editing the information showing the structure of the sentences. This apparatus displays the structure of the modification relationship by sentence structure diagrams and the result of the editing using the diagrams is reflected in the original sentences.

Another document processing apparatus, disclosed by the Japanese Patent Application Unexamined Publication No. 3-15972, (1991) comprises a dictionary means for storing information for analyzing sentences; a sentence analysis means for analyzing a sentence using information stored in the dictionary means and deciding the modification relationship between words and phrases constituting the sentence; a modification information holding means for information about modification relationships obtained from the decision result of the sentence analysis means; a sentence structure diagram formation means for forming a diagram which shows the sentence structure held in a sentence holding means in accordance with the modification relationship; and a display means for displaying the sentence structure diagram.

The apparatus can display modification relationships with "modifying" or "modified" inserted between words or phrases of the sentence in a sentence diagram, whereby the user of the apparatus is able to visually grasp the sentence structure.

Japanese Patent Application Unexamined Publication Nos. Sho. 62-284457 (1987) and Sho. 62-284459 (1987) disclose apparatuses which support overall sentence construction by proposing a prepared pattern in accordance with the purpose of the document.

The document preparation supporting apparatus disclosed by the Japanese Patent Application Unexamined Publication No. Sho. 62-284457 (1987) comprises an input means for inputting purpose sentence of a document; a purpose sentence analysis means for analyzing the purpose sentence and for abstracting key data; a memory means for storing text corresponding to combinations of the key data; a detection means for detecting text corresponding to the combination of key data from the memory means; and an expansion means for expanding sentences by selecting appropriate parts in accordance with the key data.

By utilizing this document preparation supporting apparatus, the contents of the document can be altered in accordance with the purpose of the document when it is formed.

The document preparation supporting apparatus disclosed by the Japanese Patent Application Unexamined Publication No. Sho. 62-284459 (1987) comprises a requirement analysis means for analyzing an input sentence describing the purpose of the text generation and abstracting requirement items, and an item generation means for extracting document item data corresponding to the abstracted requirement items from a memory means and generating the items required to prepare the document. This apparatus is capable of proposing items which should be included in the document, thus simplifying the document preparation.

Japanese Patent Application Unexamined Publication No. Sho. 63-66665 (1988) discloses a document analysis and arrangement restructuring apparatus which abstracts overall features of a document such as the field of application, background, problem or purpose from key word information using a key word dictionary, and supports rearrangement of the text structure. The document analysis and restructuring apparatus comprises a key word dictionary for storing key words concerning the expansion of the contents of a document; an abstracting means for abstracting key words from document data referring to the key word dictionary; a hierarchical structure analysis means for forming a hierarchical structure consisting of chapters, paragraphs or the like in the document data based on syntactic characteristics, an expansion structure control means for forming a text structure for the contents of the document data based on the hierarchical structure; and a memory means for storing the text structure. Use of the apparatus facilitates changing the text structure. Documents in various styles can also be formed easily in conformance with a conversion rule once a single set of document data has been prepared.

Japanese Patent Application Unexamined Publication No. Hei. 2-27473 (1990) discloses a document elaboration support apparatus which analyzes the structure of input text such as chapters, paragraphs and captions, and supports elaboration of the sentences utilizing the analysis result. The apparatus a text structure analysis means for analyzing the structure of text data; a structure memory means for storing the text structure; an elaboration rule dictionary prescribing elaborations; an elaboration process means for elaborating text data based on the text structures and elaboration rule dictionary; and an output means for outputting and displaying the result of the elaboration process. The document elaboration support apparatus is capable of elaborating complicated text and reduces the user burden in the elaboration of text.

The natural language processing apparatus disclosed by Japanese Patent Application Unexamined Publication No. Hei. 3-22083 (1991) analyzes the connective relationship between paragraphs, which may contain plural sentences, in a document and points out incomprehensible parts during the development of points of arguments, or amends them.

The document preparation apparatus disclosed by Japanese Patent Application Unexamined Publication No. Hei. 4-55975 (1992) analyzes the connection between sentences using a dictionary for sentence elaboration mainly consisting of information about morphological elements, and investigates inappropriate parts in the sentences to support proofreading.

Furthermore, there are document editing apparatuses called outline processors capable of easily structuring sentences from a logical aspect by editing the logical structure of text to form a tree diagram.

Systems for these apparatuses are, for example, More II for the Apple Macintosh or View Cards for the Fuji Xerox J-Star.

The document editing apparatus disclosed by Japanese Patent Application Unexamined Publication No. Sho. 63-82541 (1988) converts the interrelationship between sentences into a structure diagram and displays it, which makes it possible to edit the overall structure in broader aspects.

However, the apparatuses or systems for document elaboration described above mainly support the elaboration of finished documents except for the apparatuses supporting the elaboration from the syntactic aspects, and therefore they do not provide positive support for the writing operation itself.

For example, the natural language processing apparatus disclosed by the Japanese Patent Application Unexamined Publication No. Hei. 3-22083 (1991) analyzes the connective relationship between paragraphs, which may have plural sentences, and points out the incomprehensible parts, that is, the object of the operation is a document already input. Since the techniques described in the above-mentioned publications have been suggested for automatic analysis of an existing input sentence and to present or revise incomprehensible or incorrect points, they cannot provide editing support during the formation of sentence structures.

The outline processor described above is provided for supporting the formation of text structures in the editing process, but it cannot positively support the formation of the text structures though it provides a framework for text structure formation.

In the case of writing, generally, though the overall structure is determined in advance such that the text is divided into parts such as "Introduction", "Main discourse", "Conclusion". The inner structure of each part depends upon the text content; therefore, the inner structure cannot be determined until the contents of the text have been fully considered.

Accordingly the prior art on text editing generally relates to text written after an outline is completely determined.

In fact, there are many cases where the writer discovers flaws in the structure after beginning the writing operation. In such cases, the outline must be modified and then the text rewritten, and this process may be repeated many times.

The revision work is carried out because, while writing, the writer develops new ideas or the outline structure is progressively fixed. Even if the sentence structure is determined first, rewriting is frequently required due to unnatural linkages between sentences, incorrect outline structure, the inclusion of new material, or the like.

In the case where sentences are composed on a bottom-up basis as described above with use of a conventional document editing apparatus such as an outline processor or word processor. The writer cannot consider the structure of the whole text while writing. As a result, the structure of the whole text actually written deviates from the intended structure.

SUMMARY OF THE INVENTION

The present invention has been made in view of the above circumstances and has as an object the provision of a text editing support apparatus which overcomes the problems described above.

A further object of the present invention is to provide a text editing support apparatus which supports the structuring of text in a bottom-up manner while the user is writing. Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the text editing support apparatus of this invention comprises constituent input means for inputting constituents of text, constituent holding means for holding the input constituents, connective relationship inputting means for determining connective relationships between the constituents and inputting the relationships, connective relationship holding means for holding the connective relationships between the constituents, connection rule holding means for holding connection rules on the connective relationships between the constituents, connection rule application means for applying the connection rules to the held constituents to form text, and application result display control means for causing the result of text formation obtained by applying the connection rules to be displayed.

The text editing support apparatus according to the present invention does not wait for the detailed structure to be determined before starting the writing procedure, but writes under provisional structure and locally provides meaning to groups of sentences, whereby the system can automatically compose possible sentence structures by utilizing a knowledge of the whole structure.

Accordingly, the text editing support apparatus of the present invention enables the user to start writing without considering the detailed structure beforehand. The text editing support apparatus of the present invention is effective in the cases where, for example, a document to be written is of a type for which it is difficult to determine the sentence structure on a detailed level in the first place, where the apparatus is used for support of idea generation while fragments of sentences are written and then collected and arranged to form sentences, or where the user of the apparatus prefers to determine the structure of the text while writing it, or, in other words, to use the apparatus for support of idea generation.

Since the text editing support apparatus according to the present invention enables the user to edit sentences while drawing attention to the logical order of sentences or the like, the possibility of generating an improper structure is reduced. By using the text editing support apparatus of the present invention, the generation of text is knowledge-based, whereby the resultant structure of the sentences has a quality which is higher than a certain standard quality. For example, a sentence structure in which the logical order is confused can be avoided.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 2 illustrates a displayed image of a constituent input component of the first and second embodiments;

FIG. 3 is a table illustrating the contents of a constituent holding component of the first and second embodiments;

FIG. 4 shows a displayed image of a connective relationship input component of the first and second embodiments, illustrating a menu of the connective relationships;

FIG. 8 illustrates example rules of the connective relationships provided by the first and second embodiments;

FIG. 9 illustrates an example composition in generating sentences from the constituents shown in FIG. 7;

FIG. 10 illustrates another example composition in generating sentences from the constituents shown in FIG. 7;

FIGS. 11 (*a*) through 11 (*c*) illustrate representative constituents used in a second embodiment;

FIG. 12 is a table of the contents of the connective relationship holding component corresponding to the representative constituents used in the second embodiment;

FIG. 13 illustrates an example of a constituent display which specifies representative constituents used in the second embodiment;

FIGS. 14(*a*) and 14(*b*) illustrate other examples of the constituent display which indicate a complex constituent and a representative constituent, respectively, used in the second embodiment.

DETAILED DESCRIPTION OF THE PREFERRED EMBODIMENTS

Preferred embodiments of a text editing support apparatus according to the present invention are now described in detail based on the drawings.

First Embodiment

Figure 1:
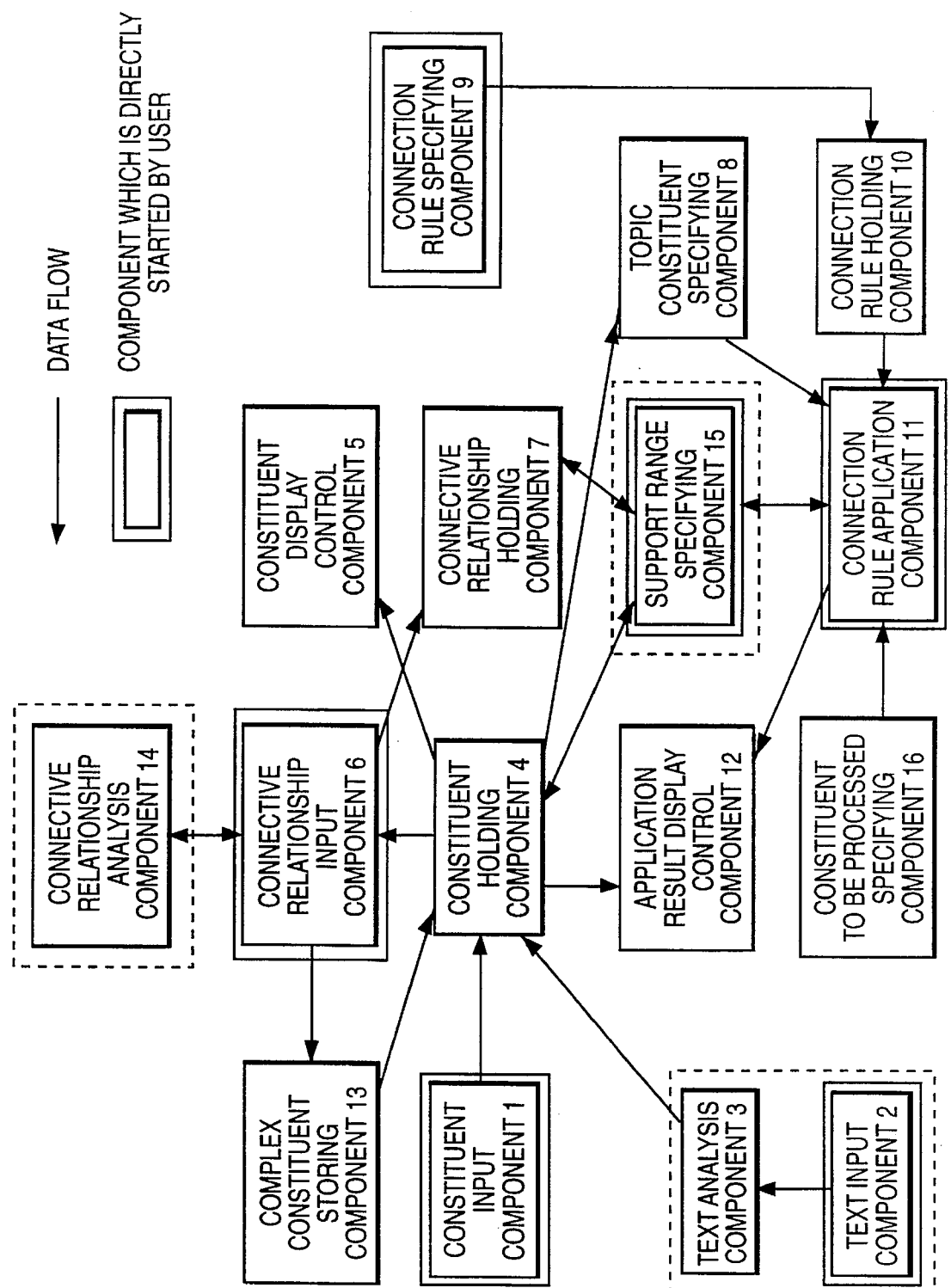
FIG. 1 is a block diagram illustrating first and second embodiments of a text editing support apparatus according to the present invention.

FIG. 1 is a block diagram illustrating a first embodiment of the text editing support apparatus according to the present invention.

In the figure, the text editing support apparatus comprises a constituent input component 1 for inputting constituents, a constituent holding component 4 for holding constituents input by the constituent input component 1, a constituent display control component 5 for controlling display of the constituents held in the constituent holding component 4, a connective relationship input component 6 for inputting connective relationships between the constituents, a connective relationship holding component 7 for holding the connective relationship input by the connective relationship input component 6, a topic constituent specifying component 8 for specifying a topic constituent, a connection rule specifying component 9 for specifying a connection rule, a connection rule holding component 10 for holding the connection rule specified by the connection rule specifying component 9, a connection rule application component 11 for editing sentences by applying the connection rules held in the connection rule holding component 10, and an application result display control component 12 for controlling the display of the result of sentence editing by the connection rules applied by the connection rule application component 11.

The text editing support apparatus may include a text input component 2 for inputting text and a text analysis component 3 for analyzing text input by the text input component 2 into constituents. The text input component 2 and text analysis component 3 may also be included in the constituent input component 1.

The text editing support apparatus may further comprise, if necessary, a complex constituent storing component 13 for storing complex constituents, which are each composed of a plurality of constituents, a connective relationship analysis component 14 for analyzing the connective relationships between the constituents input by the connective relationship input component 6, a support range specifying component 15 for limiting the range of sentences to be supported, and an object constituent specifying component 16 for specifying object constituents.

FIG. 2 illustrates a displayed image of a constituent input component of the embodiment.

Using this embodiment, the user of the apparatus inputs constituent units which are determined to be units of meaning by the constituent input component 1. A minimal constituent of text may be a single sentence or a plurality of sentences.

The constituent input component 1 may be a means of inputting the constituents as card-type representations as shown in FIG. 2, or a continuous input display, such as a conventional word processor, wherein a sentence may be determined as the minimal unit by detecting a period, or constituents may be explicitly specified by the user with a button press or the like in every inputting operation. In either case, such constituent input component 1 can be easily implemented on a conventional workstation.

If the constituent input component 1 comprises the sentence input component 2 and sentence parsing component 3, the user can input a unit such as a paragraph comprising a logical unit to the sentence input component 2 instead of regarding an input unit as a sentence terminated by a period. In this case, text which is a unit of meaning input by the user is passed to the sentence parsing component 3 and is analyzed into the constituent units, for example, sentences terminated by periods.

FIG. 3 is a table describing the contents of the constituent holding component 4 of the embodiment.

Constituents input by the constituent input component 1 are stored in the constituent holding component 4 which holds constituents such as sentences terminated by periods as constituent units.

An internal identifier is assigned to every constituent stored in the constituent holding component 4. For example, as shown in the table of FIG. 3, constituent identifiers E1, E2, E3 and so forth are assigned to the constituents and the relationship between the constituents is identified by constituent identifiers.

In the table of FIG. 3, "basic" or "complex" is assigned as the constituent classification of the constituents, where "basic" means that the constituent is a minimal constituent and "complex" means that the constituent is a complex constituent composed of a plurality of minimal constituents.

A constituent is related to other constituents by the user. In order to determine these relationships, the connective relationship input component 6 is accessed, where the user selects constituents already input and specifies a connective relationship supposed to be appropriate between the selected constituents. For example, a constituent identified as constituent identifier E3 is composed of a plurality of constituents which are connected with a connective relationship R1.

FIG. 4 shows a displayed image of a connective relationship input component 6 of the embodiment for illustrating a menu of the connective relationship.

In FIG. 4, the displayed image comprises a first display component for representing constituents and a second display component for representing a menu of connective relationship between the constituents. To select a constituent, the constituent represented in a card-type representation on a display is selected by a mouse or keyboard operation. In the process of inputting a connective relationship between constituents by the connective relationship input component 6, a menu of proposed connective relationships which is possessed of the text editing support apparatus in advance, whereby the user can select the desired relationship from the menu.

Figures 5, 6:
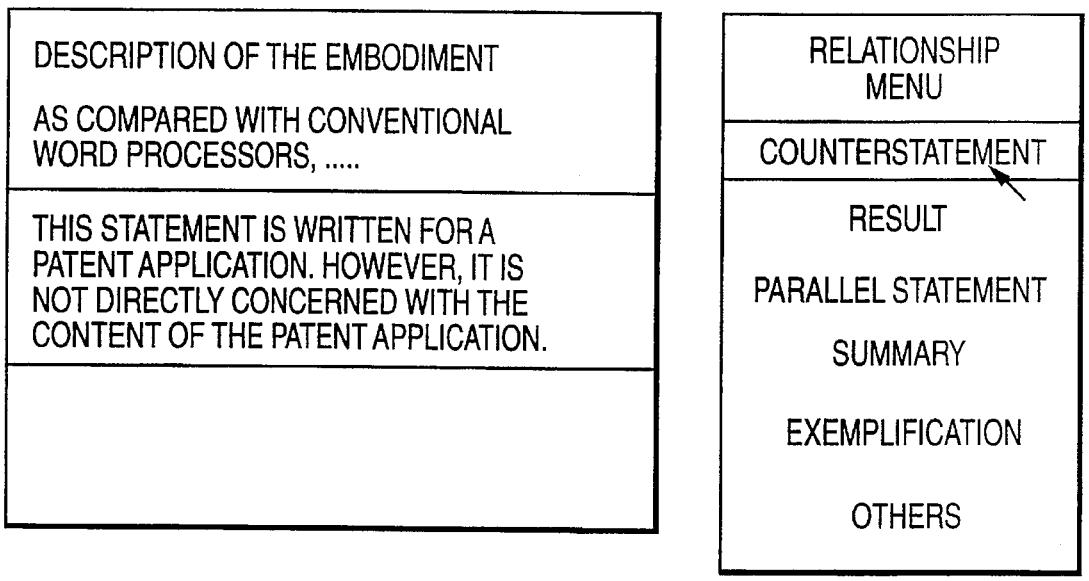
FIG. 5 shows the displayed image of the connective relationship input component of the first and second embodiments, illustrating another menu of connective relationships.
FIG. 6 is a table illustrating the contents of a connective relationship holding component of the first embodiment.

FIG. 5 shows the displayed image of the connective relationship input component 6 of the embodiment for illustrating another menu of the connective relationship.

The connective relationship input component 6 can be implemented by another method in which the user determines the relationship between sentences which are input together, instead of specifying individual constituents. That is, the sentences successively input are parsed into constituents by the sentence parsing component 3, and the user specifies the connective relationship between the constituents by the connective relationship input component 6. The connective relationship can be specified on a displayed image which is the same as that of the conventional word processor.

The connective relationship analysis component 14 can automatically specify the connective relationship in place of the user. For example, regarding the connective relationships concerned with importance, the user does not need to order the constituents, but the text editing support apparatus may automatically carry the ordering. The methods of determining the importance of individual constituents has been disclosed by Japanese Patent Application Unexamined Publication Nos. Hei. 2-181261 (1990), Hei. 3-378270 (1991), Hei. 4-24869 (1992) and Hei. 4-74259 (1992).

The constituent display control component 5 carries out control so that the contents of the constituents held in the constituent holding component 4 are displayed. To display the constituents, an individual display type, as shown in FIG. 4 and a conventional word processor type, as shown in FIG. 5 are provided. In either case the form of the display has a close relation with the function of the constituent input component 1. When the constituents are displayed, the connective relationships can may also be displayed correspondences to constituents.

In FIGS. 4 and 5, the menu of the connective relationship for selecting the connective relationship between sentences has the following items: "Counterstatement" representing negative conjunctive relationships expressed by "but", "though", or the like; "Result" representing conjunctive relationship of result expressed by "as a result of which", or the like; "Parallel statement" representing a parallel conjunction of the constituents; "Summary" representing conjunctive relationship of summary expressed by "in short" "as described above", or the like; "Exemplification" representing conjunctive relationship of exemplification expressed by "for example" or the like; and "Others".

The menu of the connective relationships for selecting the connective relationship between sentences can further include items "complex" and "automatic".

FIG. 6 is a table describing the contents of a connective relationship holding component 7 of the embodiment.

The connective relationships which have been input by the connective relationship input component 6 or analyzed by the connective relationship analysis component 14 are held in the connective relationship holding component 7 where constituent identifiers for specified constituents and specified connective relationships are held. In this case, the order of the constituent identifiers is an important matter depending on the sort of specified connective relationship. For example, when a connective relationship is concerned with "Importance", a constituent identifier indicates the order of importance, and when a connective relationship is concerned with "Reason", the order of constituent identifiers indicates which one of the constituents is connected by reason of another constituent.

Further, for example, the contents of the connective relationship holding component 7 represent constituents E1 and E2 having a "Counterstatement" connective relationship which is expressed by a connective relationship identifier R1, and constituents E3 and E4 having "Reason" connective relationship which is expressed by a connective relationship identifier R2, as shown in the table of FIG. 6.

The type of the connective relationship for a connective relationship identifier R3 is shown as "–" in the table, which means that no connective relationship is determined between constituents E5, E6 and E7. The type of the connective relationship "–" is also used in the case there is some relationship which cannot be determined exactly.

Since this embodiment further comprises a complex constituent registration component. 13, minimal constituents can be compounded to form a .complex constituent. For example, a plurality of constituents which are related to each other by the connective relationship input component 6 can be dealt with as a single constituent by registering them in the complex constituent registration component 13. Accordingly, those related by the connective relationship input component 6 are all regarded as the complex constituents and passed from the complex constituent registration component 13 to the constituent holding component 4.

In the table of FIG. 3, the type of the constituent given to the constituent E3 is "complex", thereby E3 is a complex constituent. In the table, the contents of the complex constituent is indicated by the identifier of the connective relationship by which the complex constituent is formed. Therefore, the contents of the constituent E3 in the table of FIG. 3 is the connective relationship R1 which is composed of the constituents E1 and E2, by reference to the table of FIG. 6 which describes the contents of the connective relationship holding component 7. In the case where the complex constituent can be dealt with, the constituent display control component 5 may carry out the control so that the display of the constituents is limited to a specified hierarchical level of complex constituent.

When input of a series of constituents by the constituent input component 1 is completed, the user starts the connection rule application component 11. Based on information on the constituents and on the connective relationship held in the constituent holding component 4 up to the present and the connective relationship holding component 7, respectively, the connection rule application component 11 composes the sentence structure referring to the rules of connective relationship held in the connection rule holding component 10.

Figure 7:
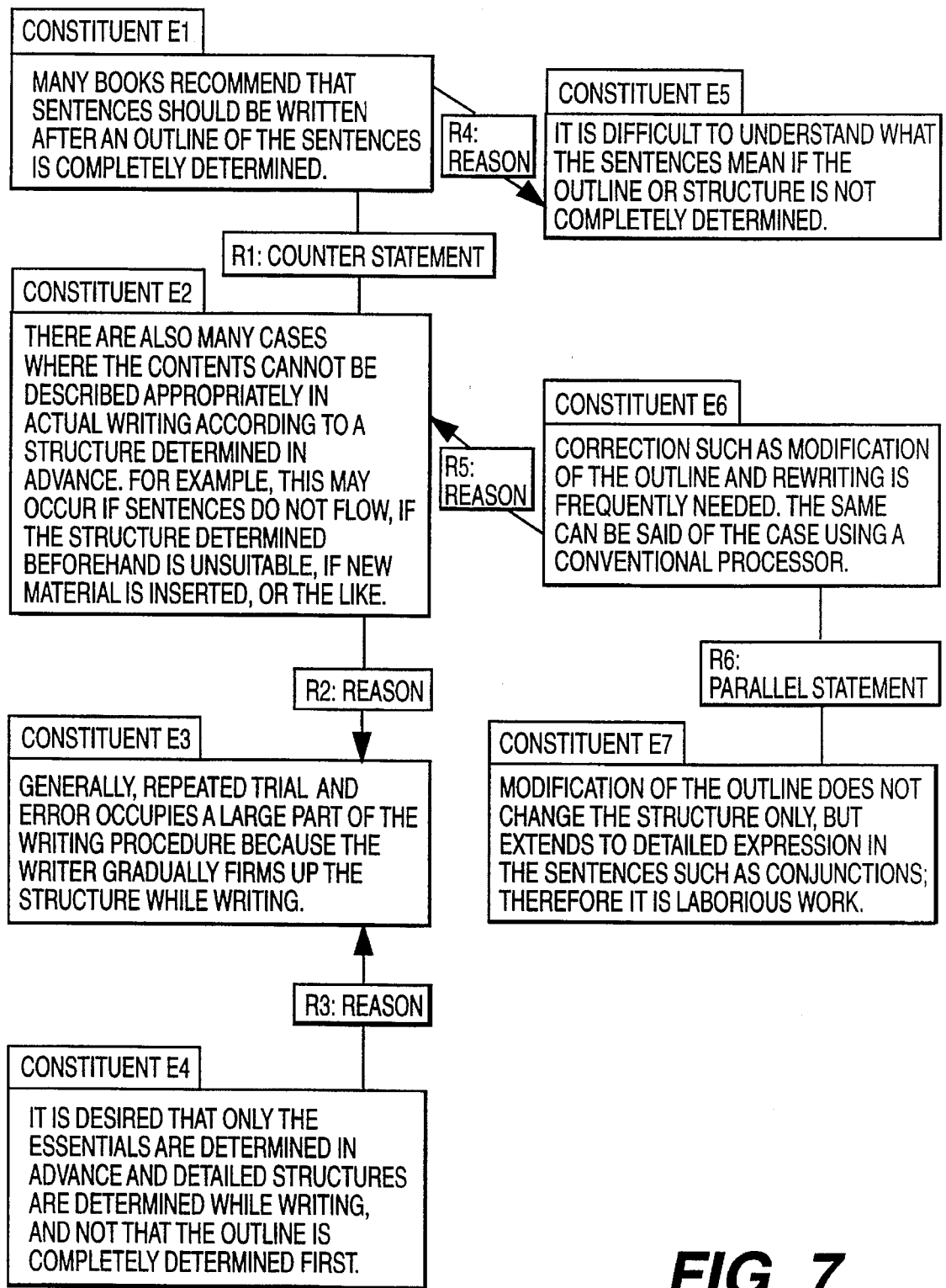
FIG. 7 illustrates constituents related to each other by the connective relationships provided by the first and second embodiments.

FIG. 7 illustrates constituents related to each other by the connective relationships in the embodiment, where an example is provided for how the connection rule application component 11 actually works. To improve visualization, the contents of FIG. 7 are the same as those shown in tables of FIGS. 3 and 6 as opposed to a data structure form such as the tables of FIGS. 3 and 6 respectively concerning the constituent holding component 4 and connective relationship holding component 7.

In FIG. 7, no use is made of the connective relationship between the complex constituents to simplify the example. Arrows in the figure indicate the order of holding the constituents in the connective relationship holding component 7. For example, the connective relationship R2 means that the constituent E3 is "Reason" of the constituent E2. The connective relationship which lacks an arrow is "Parallel statement", a connective relationship having no direction.

FIG. 8 illustrates an example of rules of the connective relationship in this embodiment. In the figure, natural language is used for simplifying the illustration. Actually, the connection rules are implemented by means of a computer programming language or the like, which is easily carried out with conventional technology.

The example in FIG. 8 basically consists of six rules and rules 1 and 6 have choices specified by the user depending on writing style.

Rule 1 is applied to the case where the topic has been specified: "If the user specifies a constituent A as the topic, it should be written first".

Rule 1' is also applied to the case where the topic has been specified: "If the user specifies a constituent A as the topic, it should be written last".

Rule 6 is applied to the connective relationships concerning "reason" to designate whether the reason should be described before or after the other constituent: "If a constituent A is a reason for another constituent B, A should be written before B".

Rule 6' is also applied to the connective relationship relating to "reason" to designate whether the reason should be written before or after the other constituent: "If a constituent A is the reason for another constituent B, A should be written after B".

Plural choices are provided for both rules 1 and 6.

Rule 2 is applied to prevent sentence complication due to intersection of the connective relationships: "A connective relationship may not intersect another connective. relationship".

Rule 3 is applied to give priority to a shorter sentence out of a series of sentences which are inserted later (in the course of the process): "If a constituent A has plural connective relationships, priority should be given to the connective relationship having the fewest dependent constituents".

Rule 4 governs the style of itemizing: "If a constituent has three or more connective relationships which are the same, they should be output in an itemized form".

Rule 5 governs the ordering of "reason" and "counterstatement": "If a constituent A has a plurality of connective relationships and they are 'reason' and 'counterstatement', a constituent to which the connective relationship of 'reason' is directed is positioned closer to the constituent A than a constituent to which the connective relationship of 'counterstatement' is directed".

In this example, rules 2, 3, and 4 apply to structural connective relationships and the rules 1, 5, and 6 apply to semantic connective relationships. There may be other rules: a rule concerned with the relative importance of constituents: "to arrange constituents in the order importance" or "to arrange constituents in reverse order of importance"; a rule concerned with time: "to arrange constituents in chronological order" or "to arrange constituents in reverse chronological order"; and a rule concerned with spatial relationship: "to arrange constituents along the space between positions A and B".

The connection rule specifying component 9 is used for selecting the rules described above, and selects a rule to be applied from rules belonging to the text editing support apparatus in advance according to the purpose of the document or the user's writing style. One method of implementing the selection of the connection rules is a system in which all of the rules correspond to individual files in an external memory device of a computer and the user selects a connection rule or a group of connection rules as required. The connection rule specifying component 9 may be a means for determining the rules to be applied based on key words frequently appearing in sentences currently processed by the text editing support apparatus and for switching connection rules appropriately.

The complexity of a complex constituent is also considered to be related to the degree of abstraction of the meaning of sentences composed of those constituents. Accordingly, if the rules to be applied are desired to be switched corresponding to the degree of abstraction, that is, if a rule concerned with overall structure and a rule of connection of detailed text are desired to be controlled for application, these rules may be switched by referring to the complexity of the complex constituents.

It is unnecessary that all of the rules in a group be satisfied. The rules are evaluated in a priority order and rules evaluated as not satisfied do not need to be satisfied. Regarding the priority order, it is possible to assign the priority order numbers to the rules themselves, or to arrange the rules in the order of the priority as in this example.

This embodiment has a topic constituent specifying component 8 for specifying the topic of a structure to be output. When the user directly specifies a constituent, the topic constituent specifying component 8 causes a structure to be composed having the constituent as the topic. The constituent selected as the topic is evaluated by a connection rule and then specially processed. In this embodiment, the rule 1 corresponds to it. Of course, this has no significance unless the connection rule holding component 10 has at least one rule for processing the topic.

However, it is not indispensable to specify the topic. The connection rule application component 11 may be started without specifying the topic, and rules prescribing a process concerned with the topic are then not applied.

When the input of constituents, connective relationships, specification of connection rules and, if necessary, a topic constituent by the user are completed, the connection rule application component 11 is started. The connection rule application component 11 traces the connective relationships between the constituents and evaluates the constituents in order. The evaluation is continued until all of the constituents, or constituents within a range then if specified by the support range specifying component 15 to apply the rule, are processed. The basic processes of the connection rule application component 11 are as follows.

(1) The constituent to be processed is specified by the user. If not specified by the user, the constituent is determined referring to the rules.

(2) The constituent is marked as "evaluated", and the connection rules are applied to it in the priority order.

(3) The current constituent and the state of its evaluation is stored, for example, on a stack and then the next constituent to be processed is determined and the process in (2) is invoked recursively.

The next constituent is determined by following (a) or (b):

(a) The next constituent is determined by a rule.

(b) If a constituent has a connective relationship which has not been traced and a constituent to which the relationship is directed has not been marked as "evaluated", the constituent is determined to be the next constituent.

(4) If a next constituent cannot be determined because, for example, all of the constituents to which connective relationships are directed have been marked as "evaluated", the state is reinstated from the stack and control returns to the calling process, after carrying out post-processing. For example, in the case where a constituent to which a connective relationship of the current constituent is directed has been evaluated by a rule prior to the current constituent, the current constituent itself has thus not been evaluated and is carried out post-processing.

The above-described process is repeated until all of the constituents are processed. This method can generate only one example. However, by accumulating information on other choices during the process (3), it is possible to backtrack, whereby the process can be continued until all possible examples are generated.

A special process is unnecessary to implement the above process which continues until all possible examples are generated, and conventional techniques (for example, execution by a sequential interpreter, such as for the Prolog programming language) are sufficient to realize the process, and therefore detailed explanation of the implementation is omitted.

The next example will explain how the process proceeds, wherein the connection rules shown in FIG. 8 are applied to the connective relationships between the constituents shown in FIG. 7.

Assume that the user specifies the constituent E4 as the topic constituent and selects rule 1' (the topic constituent is written first) and rule 6' (the "reason" is written later) from choices.

The term "position" appears in the following process, the meaning of which is to hold the constituents in an appropriate order in another memory location of the constituent holding component.

FIG. 9 is an example structure for forming sentences from the constituents shown in FIG. 7.

1. As shown in FIG. 8, rule 1' designates the topic constituent to be written first; therefore the constituent E4 is determined to be the last constituent. Because the constituent positioned last is determined first, the positions of the remaining constituents are determined from the next to last to the first one in reverse order.

2. From the relationship shown in FIG. 7, it is seen that the constituent E3 is the "reason" for the constituent E4; therefore the constituent positioned next to the constituent E4 is determined to be the constituent E3 by tracing the connective relationship R3.

3. The connective relationship R2 between the constituents E2 and E3 is "reason" and rule 6' is applied thereto. Since rule 6' states that a constituent A is written after a constituent B if the constituent A is the "reason" for the constituent B, the constituent E2 is written before the constituent E3. That is, the constituent E3 is positioned before the constituent E4.

4. The connective relationships of the constituent E3 have now been processed; therefore control turns to the processing of the constituent E2.

5. As shown in FIG. 7, the constituent E2 has connective relationships R1 and R5, both of which have not yet been processed. As shown in FIG. 8, rule 5 states that if a constituent A has a plurality of connective relationships and they are "reason" and "counterstatement", a constituent to which the connective relationship of "reason" is directed is positioned closer to the constituent A than a constituent to which the connective relationship of "counterstatement" is directed. According to rule 5, therefore, the connective relationship R5 obtains priority Rule 6', stating that a constituent A is written after a constituent B if the constituent A is the "reason" for the constituent B, is applied to the connective relationship R5, thus locating the constituent E2 after the constituent E6.

Accordingly, the constituent E2 is positioned before the constituent E3.

6. The constituent E6 has a remaining connective relationship E6. Because no rule applying to the connective relationship R6 exists, the constituents E7 and E6 are positioned before the constituent E2 in this order.

7. Because the constituent E7 has no connective relationship, control returns to processing of the constituent E2, and further moves to the process of the constituent E1 by tracing the connective relationship R1 which has not been processed.

8. The constituent 1 has the connective relationship R4 which has not been processed. Rule 6', stating that a constituent A is written after a constituent B if the constituent A is the "reason" for the constituent B, is applied to the connective relationship R4, thus locating the constituent E5 after the constituent E1. As a result, The constituents E1 and E5 are positioned before the constituent E7 in this order, whereby the processing is completed.

In this case, the constituents are positioned in the order shown in FIG. 9 to form text. The application result display control component 12 formats the text generated as described above into the form of normal sentences so that the user can easily understand it, and displays it on a display device (not shown in the figure). The following is a result of the display, wherein bracketed parts are conjunctions inserted for easy reading based on the connective relationships, which do not exist in the original text formed by the constituents. The application result display control component 12 may be constructed to enable the conjunctions to be automatically derived from the connective relationships and then inserted between constituents.

An example of processing for structuring text using the text editing support apparatus according to the present invention is as follows:

Constituent E1: "Many books recommend that sentences should be written after an outline of the sentences is completely determined."

Constituent E5: [Because ] "It is difficult to understand what the sentences mean if the outline or structure is not completely determined."

Constituent E7: [However,] "Modification of the outline does not change the structure only, but extends to detailed expression in the sentences such as conjunctions; therefore it is laborious work."

Constituent E6: "Correction such as modification of the outline and rewriting is frequently needed. The same can be said of the case using a conventional outline processor."

Constituent E2: [Because] "There are many cases where the contents cannot be described appropriately in actual writing according to a structure determined in advance. For example, this may occur if sentences do not flow, if the structure determined beforehand is unsuitable, if new material is inserted, or the like."

Constituent E3: [Because,] "Generally, repeated trial and error occupies a large part of the writing procedure because the writer gradually firms up the structure while writing."

Constituent E4: [Accordingly,] "It is desirable that only the essentials are determined in advance and detailed structures are determined while writing, and not that the outline is completely determined first."

In the above-described structuring, in order to assert the content of the constituent E4, the constituents are output so that the description begins with a contrary opinion and is developed in appropriate order. Since the bracketed parts are conjunctions automatically inserted by the system, they sometimes appear to be unnatural on reading. However, the output structure as a whole has a meaning in its own way.

It is unnecessary that the connective relationships specified by the user and those in the text actually formed are exactly consistent. If they are widely different from each other, as a matter of course, the output structure is incoherent. However, a slight difference may produce a possibility of forming a structure from another viewpoint, thus supporting the user in having new ideas.

Another process example for structuring text by using the text editing support apparatus according to the present invention is now described. As stated above, the connection rules in FIG. 8 apply to the connective relationships shown in FIG. 7. Suppose that the constituent E3 is specified as the topic constituent and rule 1 ("If the user specifies a constituent A as the topic, it should be written first") and rule 6 ("If a constituent A is the "reason" for the constituent B, A should be written before B") are rule choices.

1. Since the constituent E3 is specified to be the topic constituent, it is positioned at the beginning of the text by rule 1.

2. The constituent E3 has connective relationships R2 and R3, both of which are "reason". The constituent E4 to which the connective relationship R3 is directed is positioned after the constituent E3 by the rule 3, "If a constituent A has plural connective relationships, priority should be given to the connective relationship having the fewest dependent constituents".

3. All of the connective relationships related to the constituent E4 have already been evaluated, and therefore control returns to the constituent E3 and then proceeds to the processing of the constituent E2 through the connective relationship R2.

4. The constituent E2 has connective relationships R1 and R5 which are not evaluated. The connective relationship R5 is given a priority by rule 5, "If a constituent A has plural connective relationships and they are 'reason' and 'counterstatement', a constituent to which the connective relationship of 'reason' is directed is positioned closer to the constituent A than a constituent to which the connective relationship of 'counterstatement' is directed". According to rule 6, "If a constituent A is the 'reason' for the constituent B, A should be written before B", the constituent E2 is written before the constituent E6; therefore the constituent E2 is positioned after the constituent E4, and then control proceeds to the processing of the constituent E6.

5. R6 is the only unevaluated connective relationship related to the constituent E6. Because there is no rule applying to the connective relationship R6, the constituents E6 and E7 are positioned after E2 in this order.

6. Since the processing of the constituents E6 and E7 has been finished, control returns to the constituent E2, and then proceeds to the processing of the constituent E1 through the connective relationship R1 which is not processed.

7. Rule 6, "If a constituent A is the 'reason' for the constituent B, A should be written before B", is applied to the connective relationship R4 related to the constituent E1, and accordingly the constituent E5 is written before the constituent E1. The E5 and E1 are positioned after the constituent E7 in this order, and then all processing are completed.

As a result of the above-described processing, a structure is output as shown in FIG. 10. The result is displayed by the application result display control component 12 on a display device (not shown in the figure).

For example, the result is displayed on the display device as follows:

Constituent E3: "Generally, repeated trial and error occupies a large part of the writing procedure because the writer gradually firms up the structure while writing".

Constituent E4: [Because] "It is desirable that only the essentials are determined in advance and detailed structures are determined while writing, not that the outline is completely determined first".

Constituent E2: [Accordingly,] "There are many cases where the contents cannot be described appropriately in actual writing according to a structure determined in advance. For example, this may occur if sentences do not flow, if the structure determined beforehand is unsuitable, if new material is inserted, or the like".

Constituent E6: [Accordingly,] "Correction such as modification of the outline and rewriting is frequently needed. The same can be said of the case using a conventional outline processor".

Constituent E7: [Additionally,] "Modification of the outline does not change the structure only, but extends to detailed expression in the sentences such as conjunctions; therefore it is laborious work".

Constituent E5: [However,] "It is difficult to understand what the sentences mean if the outline or structure is not completely determined".

Constituent E1: [Therefore,] "Many books recommend that sentences should be written after an outline of the sentences is completely determined".

In this example, the constituent E3 is specified to be the topic, different from the preceding example. Because the constituent E4 originally includes a positive assertion "It is desirable that . . . ", the present example reads less fluently than the preceding one. However, by means of a little editing, the following text is obtained:

Constituent E3: "Can it be said, generally, that repeated trial and error occupies a large part of the writing procedure because the writer gradually firms up the structure while writing, cannot it?"

Constituent E4: "Because there are many cases where only the essentials are determined in advance and detailed structures are determined while writing, not that the outline is completely determined first".

Constituent E2: "There are also many cases where the contents cannot be described appropriately in actual writing according to a structure determined in advance. For example, this may occur if sentences do not flow, if the structure determined beforehand is unsuitable, if new material is inserted, or the like".

Constituent E6: "Accordingly, correction such as modification of the outline and rewriting is frequently needed. The same can be said of the case using a conventional outline processor".

Constituent E7: "Additionally, modification of the outline does not change the structure only, but extends to detailed expression in the sentences such as conjunctions; therefore it is laborious work".

Constituent E5: "However, it is difficult to understand what the sentences mean if the outline or structure is not completely determined".

Constituent E1: "Therefore, many books recommend that sentences should be written after an outline of the sentences is completely determined".

Constituent E8: "The opinion is true, but actual sentence formation may not be carried out so lucidly".

Thus, a sentence structure is formed in which the contents of the constituent E3 is asserted while posing a question to the contents of the constituent E1. In this manner, text having a different structure can be formed by rearranging the same constituents taking the connective relationships into consideration.

As previously described, it is not a purpose of this embodiment to realize perfect automation of text editing. The intention of this embodiment is to suggest a different structure of the text to the user and to support the text formation.

If the user desires to be partly supported by the apparatus in text editing, the support range specifying component 15 can be used for specifying the range of the sentences to be supported in editing.

If it is desired to write some text in disregard of the rules, or to save a part of the written sentences and rewrite the other part of the sentences, this can be realized by marking the constituents of the sentences as "no rewriting" and adding a step, "If a constituent is marked 'no rewriting', the processing of the constituent should be omitted" to the steps of the connection rule application component 11.

Second Embodiment

FIG. 11 illustrates a second embodiment using representative constituents.

In the first embodiment, representative constituents are not used. By using representative constituents, it is easier to correlate the complex constituents with each other.

The complex constituent is composed of a plurality of constituents having hierarchical relationships with one another, and in a complicated case, it may be composed of some tens or more basic constituents. In such a case, it is difficult to grasp the contents represented by the plural constituents at a glance, which makes it difficult to correlate the complex constituent with other complex constituents or basic constituents in a process of inputting relationships.

By using representative constituents representing the complex constituents, it is possible to broadly grasp the contents of the complex constituents by referring to their representative constituents. In other words, the representative constituents correspond to main sentences in paragraphs.

For example, assume that there are connective relationships among some of the constituents E0–E15 as shown in FIGS. 11(a)–(c). In FIG. 11(a), the constituent E1 consists of the constituents E0, E12 and E13, and E13 further consists of the constituents E14 and E15. In FIG. 11(b), the constituent E2 consists of the constituents E3 and E4, and E4 further consists of the constituents E5, E6 and E7. In FIG. 11(c), the constituent E8 consists of the constituents E9, E10 and E11.

Under the relationships described above, assume that the complex constituents E1 and E2 are related to each other. The complex constituent E1 consists of four basic constituents: E0, E12, E14 and E15. The complex constituent E2 also consists of four basic constituents: E3, E5, E6 and E7.

Accordingly, it is basically impossible to relate the complex constituents E1 and E2 to each other, unless the user finishes reading the contents of eight basic constituents in total; otherwise the meaning of the complex constituents E1 and E2 cannot be understood.

To avoid such laborious work, representative constituents are introduced to this embodiment, which are distinguished by double-lined frames in FIGS. 11(a)–(c) and represent the contents of complex constituents which are higher in the hierarchy.

In FIG. 11(a), for example, the representative constituent of the complex constituent E13 is E14, and the representative constituent of the complex constituent E1 is E13. Consequently, the representative constituent of the complex constituent E1 is E14.

In FIG. 11(b), the representative constituent of the complex constituent E2 is E3.

Accordingly, it is possible to relate the complex constituents E1 and E2 to each other by only reading and understanding the contents of E14 and E3 representing E1 and E2, respectively.

FIG. 12 is a table of the contents of the connective relationship holding component 7 corresponding to representative constituents used in this embodiment.

Implementation of the concept of representative constituents only requires that data fields for the representative constituents are provided to the connective relationship holding component 7.

A data field for a representative constituent holds one of the constituents included in a constituent list as a representative constituent.

The constituent display control component 5 of the support apparatus using representative constituents controls the display so that the representative constituents are explicitly displayed, or, alternatively, it has two modes of controlling the display so that the complex constituents are indicated by their representative constituents only, or by all of the constituents composing the complex constituents.

FIG. 13 illustrates an example of a constituent display device which explicitly displays representative constituents used in this embodiment, wherein an underlined part indicates the representative constituent.

FIGS. 14(a) and 14(b) illustrate other examples of the constituent display device which has two modes: displaying the whole complex constituent and displaying a representative constituent only, respectively, used in this embodiment.

Figure 15:
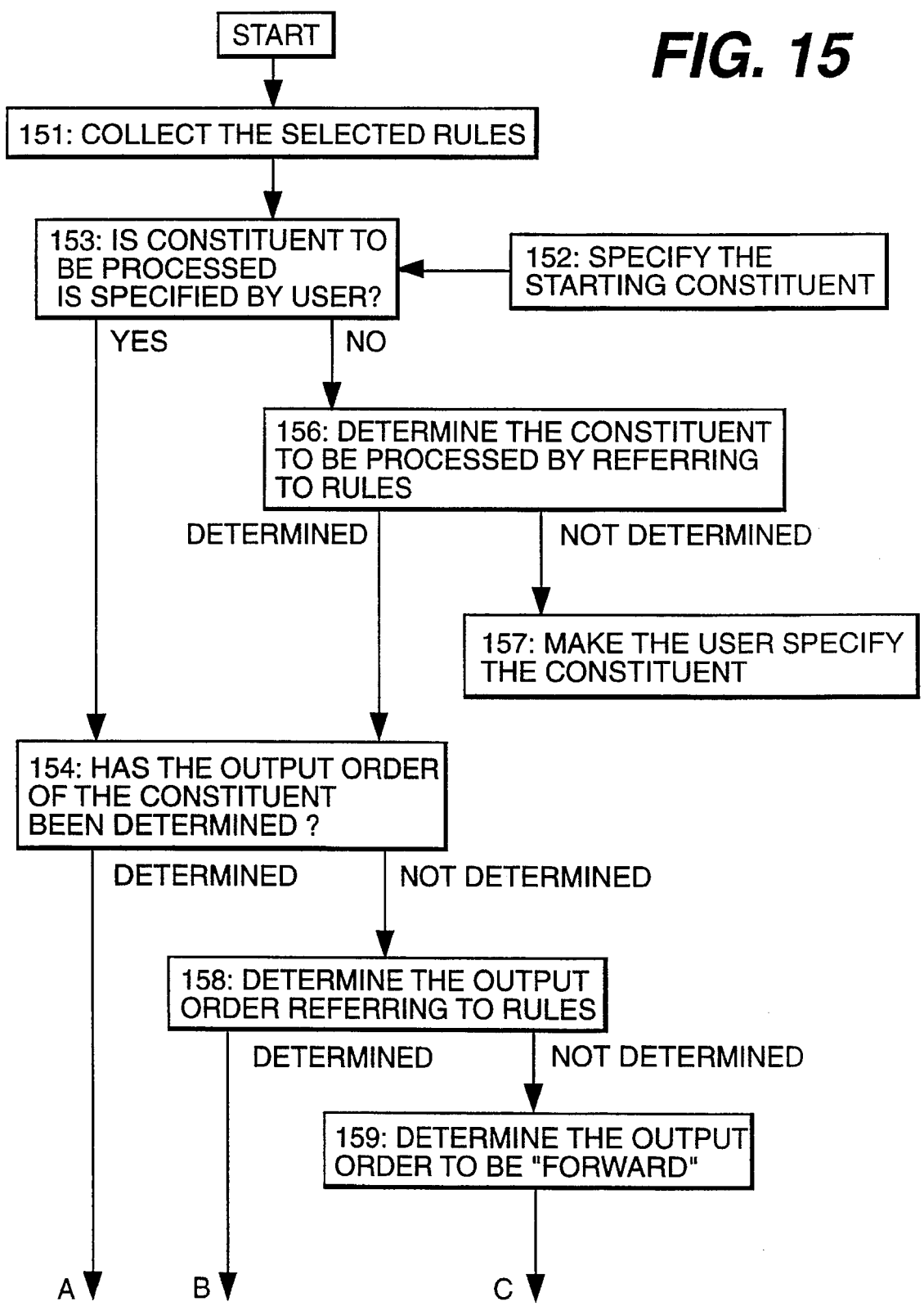
FIGS. 15 and 16 are flow charts illustrating operations of a connection rule application component of the first and second embodiment.
Figure 16:
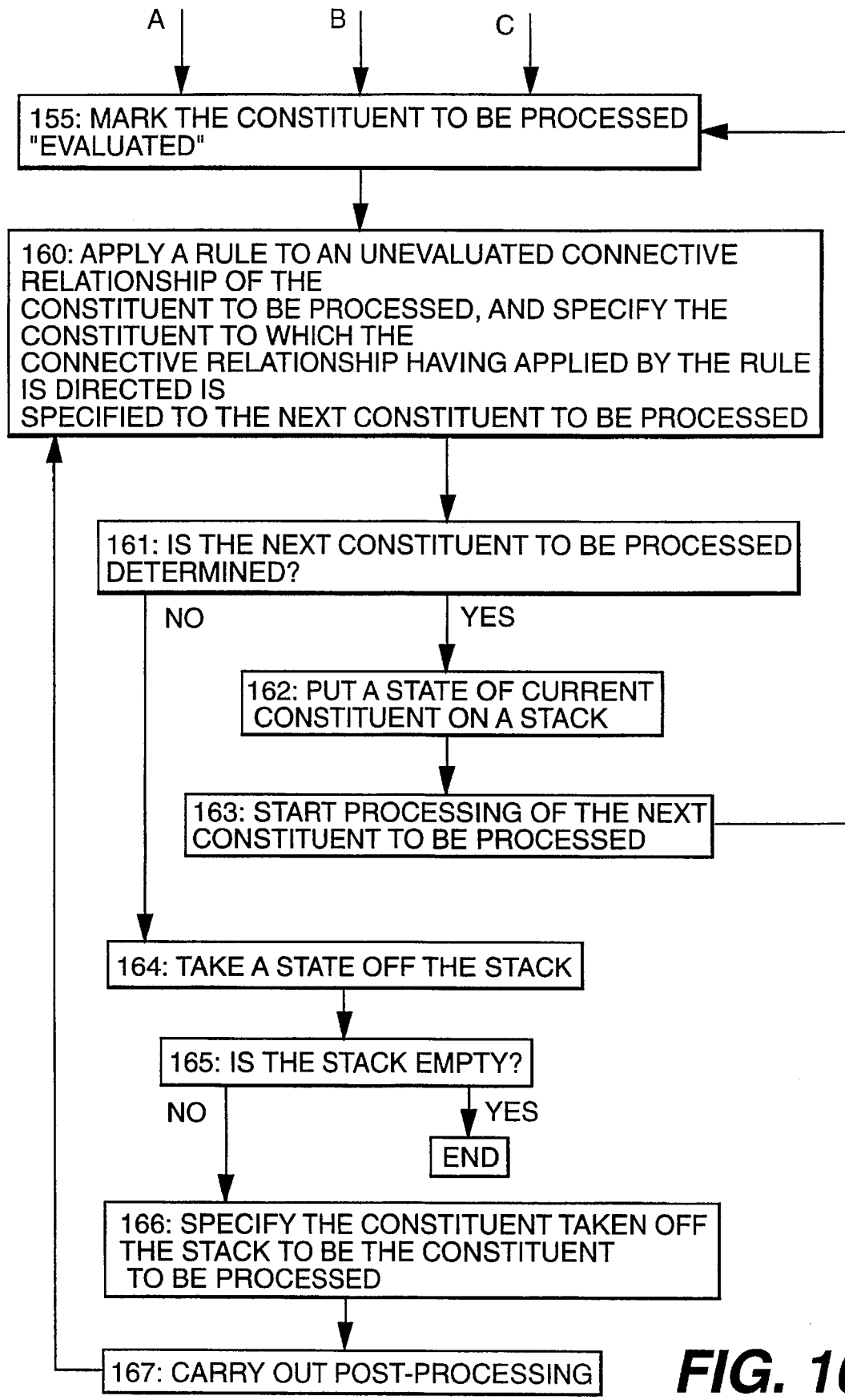

FIGS. 15 and 16 are flow charts illustrating operations of a connective rule application component of the embodiment and arrows A, B and C in FIG. 15 correspond to arrows A, B and C in FIG. 16, respectively.

Step 151: Rules selected from the connection rule holding component 10 to be applied to form text are collected in the connection rule application component 11.

Step 152: The user specifies a constituent to be processed through the specifying component 16 for starting processing.

Step 153: The connection rule application component 11 investigates whether the constituent to be processed has been specified by the user.

Step 154: If the constituent to be processed is judged to have been specified by the user, the connection rule application component 11 further investigates whether the output order of the constituent has been determined.

Step 155: If the output order of the constituent for processing has been determined, the connection rule application component 11 marks the constituent "evaluated".

Step 156: If the constituent to be processed is not judged to have been specified by the user in step 153, the connection rule application component 11 specifies the constituent for processing, with reference to the rules.

Step 157: If the connection rule application component 11 can specify the constituent to be processed, control proceeds to step 154 and the constituent undergoes the process described above. If the connection rule application component 11 cannot specify the constituent to be processed, the portion 11 requests the user to specify them.

If the constituent for processing is specified by the user in step 157, control proceeds to step 154 and the constituent undergoes the process described above.

Step 158: If the output order of the constituent to be processed is not determined in step 154, the connection rule application component 11 determines it with reference to the rules, and then control proceeds to step 155 to mark the constituent "evaluated".

Step 159: If the connection application component 11 cannot determine the output order of the constituent in spite of referring to the rules in step 158, the order is determined to be "forward", and central then proceeds to step 155 to marks the constituent "evaluated".

Step 160: The connection rule application component 11 applies the rules to relationships of constituents for processing which are unevaluated and specifies the constituent to which the relationship evaluated here is directed to be the next constituent to be processed.

There are some cases, where since a process is actually carried out at later stages, information on the process is stored in a memory area. For example, in the case where a rule of early evaluation of a constituent, to which a relationship of the current constituent for processing is directed is applied, the constituent is evaluated earlier than the current constituent for processing, through the relationship, and the current constituent is positioned later.

If there is no rule to be applied for processing a constituent to be processed and the constituent is unevaluated, it is now positioned. Here to "position" a constituent means to store the constituent in another memory area in the constituent holding component 4 in appropriate order. The output order of the constituents previously determined is used here.

Step 161: The connection rule application component 11 investigates whether the next constituent to be processed can be determined.

The next constituent to be processed is determined as follows:

1. A rule determines the next constituent to be processed;
2. If a current constituent for processing has a relationship which is not traced and a constituent to which the relationship is directed has no "evaluated" mark, the constituent is specified to be the next constituent to be processed.

Step 162: If a new constituent can be specified to be the next constituent for processing, the connection rule application component 11 puts a state of the current constituent on a stack.

Step 163: The connection rule application component 11 specifies the next constituent for processing and marks it "evaluated", and repeats the above-described processes until all of the constituents are used.

In step 161, if the connection rule application component 11 judges that a next constituent to be processed cannot be determined, the connection rule application component 11 takes the state off the stack (step 164).

The connection rule application component 11 investigates whether the stack is empty (step 165).

If the connection rule application component 11 judges that the stack is empty, it terminates the process. If the connection rule application component 11 judges that the stack is not empty, it takes a state from the stack and specifies a constituent corresponding to the state to be a next constituent for processing (step 166).

The connection rule application component 11 carries out the post-processing of the constituent to be processed specified in step 166 (step 167).

Control proceeds to step 160 and the post-processing is repeated until the stack becomes empty.

The processes shown in flow charts in FIGS. 15 and 16 are now described in reference to the constituents shown in FIG. 7.

The connection rule application component 11 first selects rules 1', 2, 5 and 6'.

The constituent E4 in FIG. 7 is assumed to be the specified topic constituent.

Because the constituent E4 is determined to be positioned at the last of the text by rule 1', E4 is made to be a constituent for processing. Since the last constituent is determined, the output order is determined to be "reverse". The constituent E4 is marked "evaluated".

Though it is possible for rule 6' to be applied to the constituent E4, rule 1' determines that the constituent E4 is positioned at the last of the text; therefore rule 6' cannot be satisfied, and there is no rule to be applied. Accordingly, the constituent E3 is specified to be the next constituent for processing tracing the unevaluated relationship R3.

A state of the constituent E4 is put on the stack.

The constituent E3 is specified to be a next constituent for processing.

The constituent E3 is marked "evaluated".

The connection rule application component 11 can apply rule 6' to the connective relationships R3 and R2 related to the constituent E3. Because the constituent E4 to which the connective relationship R3 is directed has already been processed, only connective relationship R2 undergoes the process. The constituent E3 is the "reason" for the constituent E2; therefore E3 is written after E2 by the rule 6', "If a constituent A is the 'reason' for the constituent B, A should be written after B". Thus the constituent E3 is positioned. Because the rule has been applied to the connective relationship R2, the constituent E2 to which the connective relationship R2 is directed is specified to be a next constituent to be processed.

A state of the constituent. E3 is put on the stack.

The constituent E2 determined to be the constituent to be processed is marked "evaluated". The constituent E2 has connective relationships R1 and R5, both of which direct to unevaluated constituents.

Since those unevaluated constituents have the same number of dependent constituents, rule 3 can be applied to neither R1 nor R5. Rules 5 and 6' are applied to the constituent E2. According to rule 5, the connective relationship R5 is evaluated earlier than the connective relationship R1, whereby the constituent E6 is specified to be a next constituent for processing.

Rule 6' is applied to the connective relationship R5, and therefore the constituent E2 is written after the constituent E6. Thus the E2 is positioned.

A state of the constituent E2 is put on the stack.

The constituent E6 is determined to be the next constituent for processing, and marked "evaluated".

The constituent E6 has only one connective relationship directed at a constituent which is unevaluated, that is, R6. Since there is no connection rule to be applied to the connective relationship R6, the constituent E6 is positioned next.

The constituent E7 directed to by the connective relationship R6 is unevaluated, and therefore it is possible to be a next constituent for processing. A state of the constituent E7 is put on the stack.

The constituent E7 is marked "evaluated".

Because the constituent E7 does not have a connective relationship other than R6, no rule is applied to E7. Next, a constituent for processing cannot be determined; consequently information about the constituent E6 is taken off the stack.

The constituent E6' becomes the constituent to be processed, but it has no post-processing and no connective relationship which has not been processed.

Since a next constituent for processing cannot be determined by the constituent E6, information about the constituent E2 is taken off the stack.

The constituent E2 becomes the constituent to be processed, but it has no post-processing of E2.

The constituent E2 has a connective relationship R1 which is not traced, but there is no rule to be applied to R1. Because the constituent E1, to which the connective relationship R1 has directed processing, has not yet been processed yet, it is specified to be a next constituent for processing.

A state of the constituent E2 is put on the stack.

The constituent E1 is specified to be the next constituent for processing.

The constituent E1 is marked "evaluated".

The constituent E1 has a connective relationship R4 to which rule 6' can be applied. The connective relationship R1 has already been processed. The constituent E1 is written before the constituent E5 in accordance with rule 6', whereby an instruction "the constituent E1 should be positioned" is made to post-processing. The constituent E5 becomes the next constituent to be processed.

A state of the constituent E1 is put on the stack.

The constituent E5 is marked "evaluated".

Because the constituent E5 has no connective relationship other than R1, the constituent E5 is positioned. E5 cannot be a constituent to be processed; therefore information about the constituent E1 is taken-off the stack, and E1 is made to be the next constituent for processing. Since "the constituent E1 should be positioned" has been recorded by post-processing in E1, it is positioned. The constituent E1 has no connective relationship which is unprocessed.

The next constituent for processing cannot be determined by the constituent E1; consequently information about the constituent E2 is taken off the stack and E2 is made to be the constituent to be processed. E2 has no post-processing and no connective relationship which is not processed.

Because the next constituent for processing cannot be determined by the constituent E2, information about the constituent E3 is taken off the stack and E3 is made to be the next constituent for processing. E3 has no post-processing and no connective relationship which is not processed.

Because the next constituent for processing cannot be determined by the constituent E3, information about the constituent E4 is taken off the stack and E4 is made to be the next constituent for processing. E4 has no post-processing and no connective relationship which is not processed.

The next constituent for processing cannot be determined by the constituent E4, and therefore further attempt to take information off the stack is made, but the stack is now empty. Thus, processing is terminated.

Thus far, preferred embodiments have been described in detail, but the present invention is not limited to these embodiments. It is possible to make various modifications unless they are beyond the scope of claims of the present invention.

The above preferred embodiments only describe an example of a text editing support apparatus, and it can of course be adapted to various kinds of text processing apparatus. Furthermore, in the text editing support apparatus in accordance with the present invention shown in FIG. 1, every block can be accomplished by conventional art.

As described above, according to the present invention, the text editing support apparatus constructs possible structures while the user writes sentences based on overall structure instead of a structure previously considered in detail, and locally inputs connective relationships. Therefore the user can form text without preparing detailed structure. The text editing support apparatus of the present invention is also effective when it is difficult to determine the structure of sentences in full and in advance, when the user desires to determine structure of text while writing, or, in other words, to use the apparatus as support in having new ideas, or when the user likes such a writing style and desires to use it.

Moreover, the text editing support apparatus of the present invention attracts the user's attention to logical order or the like in text while editing text, which results in decreased possibility of making improper sentence structure and produces the effect of ensuring a quality of sentence structure of at least a certain quality standard.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A text editing apparatus for rearranging sentences, comprising:

constituent input means for inputting text constituents comprising at least one sentence;

constituent holding means for holding said constituents input by said constituent input means;

connective relationship input means for inputting a connective relationship selected from plural kinds of connective relationships according to the relations among constituents held by said constituent holding means;

connective relationship holding means for holding said connective relationships input by said connective relationship input means;

connection rule holding means for holding a plurality of connection rules to select a constituent to be connected with relational constituents according to connective relationships with said relational constituents;

connection rule application means for rearranging said constituents held by said constituent holding means by means of repetition of selecting one constituent from said relational constituents, each of which has a connective relationship with the constituent selected just before, by applying said plurality of connection rules held by said connective relationship connection rule holding means to connective relationships held by said connection rule holding means according to a priority of each connection rule; and display means for displaying constituents rearranged by said connection rule application means.

2. A text editing apparatus according to claim 1, further comprising:

a constituent display control means for causing said input constituents to be displayed.

3. A text editing apparatus according to claim 2, further comprising:

complex constituent storing means for storing a plurality of minimal constituents as a single complex constituent, wherein said constituent display control means causes said display means to display the plurality of minimal constituents of said complex constituent as a single constituent.

4. A text editing apparatus according to claim 3, further comprising:

representative constituent holding means for holding a constituent identified as one of the plurality of minimal constituents forming said complex constituent as a representative constituent which represents said complex constituent; and representative constituent selecting means for selecting the representative constituent of said complex constituent from the representative constituents held by said representative constituent holding means according to the structure of said complex constituent, wherein said constituent display control means causes said display means to discriminately display said representative constituent selected by said representative constituent selecting means.

5. A text editing apparatus according to claim 4, wherein said constituent display control means causes said display means to display only said representative constituent selected by said representative constituent selecting means as said complex constituent.

6. A text editing apparatus according to claim 4, wherein said constituent display control means controls said display means to operate in either of two modes: displaying the whole of each constituent or displaying said representative constituent only.

7. A text editing support apparatus according to claim 2, wherein said constituent display control means displays, with said constituents, the kind of each connective relationship relating to said constituents.

8. A text editing apparatus according to claim 2, wherein said constituent display control means generates conjunctions based on connective relationships held in said connective relationship holding means, automatically inserts said conjunctions between constituents to form an output result, and displays said output result.

9. A text editing apparatus according to claim 1, wherein said constituent input means comprises text input means for inputting text and text analysis means for analyzing said input text into minimal constituents, each of which consists of one sentence.

10. A text editing apparatus according to claim 1, further comprising:

topic constituent specifying means for enabling a user to specify a topic constituent which is a theme of a text, wherein:

said connection rule holding means holds a topic rule to rearrange said topic constituent so that said topic constituent forms the theme of the text, and said connection rule application means rearranges text constituents according to said topic rule.

11. A text editing apparatus according to claim 1, further comprising:

connective relationship analysis means for analyzing said connective relationships among said constituents, wherein said connective relationship holding means holds connective relationships analyzed by said connective relationship analysis means.

12. A text editing apparatus according to claim 1, further comprising:

connection rule selecting means for enabling a user to select a connection rule to be applied from the plurality of connection rules held by said connection rule holding means wherein said connection rule application means applies the connection rule selected by said connection rule selecting means to rearrange text constituents.

13. A text editing apparatus according to claim 1, further comprising:

automatic connection rule selecting means for automatically selecting a connection rule to be applied from the plurality of connection rules held by said connective rule connective relationship holding means according to input text content.

14. A text editing apparatus according to claim 1, further comprising:

extent specifying means for specifying an extent to rearrange said constituents of text.

15. A text editing apparatus according to claim 1, wherein said constituent holding means holds a sentence as a minimal constituent.

16. A text editing apparatus according to claim 1, wherein said constituent holding means holds a paragraph as a minimal constituting.

17. A text editing apparatus according to claim 1, further comprising:

complex constituent storing means for storing a plurality of minimal constituents as a single complex constituent.

18. A text editing apparatus according to claim 17, wherein said connection rule application means applies the connection rules selected from said connection rule holding means according to a structural complexity of said complex constituent.

19. A text editing apparatus according to claim 1, wherein said connection rule application means determines a connective relationship between constituents to be structural, and applies a connection rule concerning the structural relationship to said connective relationship.

20. A text editing apparatus according to claim 1, wherein said connection rule application means determines a connective relationship between constituents to be logical, and applies a connection rule concerning the logical relationship to said connective relationship.

21. A text editing apparatus according to claim 1, wherein said connection rule application means determines a relative importance of a connective relationship between constituents, and applies a connection rule relating to the importance of said connective relationship.

22. A text editing apparatus according to claim 1, wherein said connection rule application means determines a chronological order of connective relationships between constituents, said connection rule application means applies a connection rule concerning chronological of relationships to said connective relationships.

23. A text editing apparatus according to claim 1, wherein said connection rule application means determines spatial position relations of connective relationships between constituents and applies a connection rule concerning spatial position relations of said connective relationships.

24. A text editing apparatus according to claim 1, wherein said connective relationship input means allows the selection of a connective relationships between constituents presented in a menu.

* * * * *

UNITED STATES PATENT AND TRADEMARK OFFICE
CERTIFICATE OF CORRECTION

PATENT NO. : 5,598,518

DATED : January 28, 1997

INVENTOR(S) : Kazuo SAITO

It is certified that error appears in the above-indentified patent and that said Letters Patent is hereby corrected as shown below:

Claim 16, column 24, line 14, "constituting" should read
--constituent--.

Claim 24, column 24, line 56, before "connective relationships", delete "a".

Signed and Sealed this

First Day of July, 1997

Attest:

Attesting Officer

BRUCE LEHMAN

Commissioner of Patents and Trademarks